United States Patent
Burleson et al.

(10) Patent No.: US 10,155,573 B2
(45) Date of Patent: Dec. 18, 2018

(54) PORTABLE INFLATABLE HABITAT WITH MODULAR PAYLOAD, SYSTEM AND METHOD

(71) Applicants: Winslow Scott Burleson, New York, NY (US); Michael Lombardi, Rumford, RI (US)

(72) Inventors: Winslow Scott Burleson, New York, NY (US); Michael Lombardi, Rumford, RI (US)

(73) Assignee: New York University, New York, NY (US)

( * ) Notice: Subject to any disclaimer, the term of this patent is extended or adjusted under 35 U.S.C. 154(b) by 0 days.

(21) Appl. No.: 15/438,415

(22) Filed: Feb. 21, 2017

(65) Prior Publication Data

US 2017/0253312 A1    Sep. 7, 2017

Related U.S. Application Data

(60) Provisional application No. 62/302,608, filed on Mar. 2, 2016.

(51) Int. Cl.
*B63C 11/32* (2006.01)
*B63C 11/44* (2006.01)
(Continued)

(52) U.S. Cl.
CPC ............ *B63C 11/325* (2013.01); *B01D 53/62* (2013.01); *B63C 11/18* (2013.01); *B63C 11/42* (2013.01);
(Continued)

(58) Field of Classification Search
CPC ....... B63C 11/325; B63C 11/44; B63C 11/42; B63C 11/34; B63C 11/30; B63C 11/52; B01D 2257/504; B01D 53/0407; B01D 2259/4566; B63G 8/001; B63G 8/14; B63G 8/08
See application file for complete search history.

(56) References Cited

U.S. PATENT DOCUMENTS

| 3,299,645 A * | 1/1967 | Link ...................... B63C 11/44 114/314 |
| 3,543,526 A * | 12/1970 | Krasberg ................ B63C 11/44 114/333 |

(Continued)

OTHER PUBLICATIONS

Lombardi, M., Burleson, W., Godfrey, J., Fryburg, R., An Experimental Deployment of a Portable Inflatable Habitat in Open Water to Augment Lengthy In-Water Decompression by Scientific Divers, 2013, Marine technology Society Journal, Nov./Dec. 2013 vol. 47 No. 6, paes 52-64. (Year: 2013).*

*Primary Examiner* — Carib A Oquendo
(74) *Attorney, Agent, or Firm* — Ansel M. Schwartz

(57) ABSTRACT

A diving apparatus for a diver underwater includes a portable habitat in which a breathable environment is maintained underwater. The habitat has a collapsible envelope. The collapsible envelope takes shape through inflation to an expanded state underwater. The habitat has a modular payload which removably attaches to the envelope underwater. The habitat has a seat on which a diver can sit while the habitat is underwater. The modular payload has a breathable gas source to provide breathable gas for the diver to breathe in the habitat and a carbon dioxide scrubber which removes carbon dioxide from the environment when the habitat is underwater. The apparatus has an anchor mechanism attached to the habitat to maintain the habitat at a desired depth underwater. A method for a diver to dive underwater. A system for supporting a diver underwater. A diving apparatus having a propulsion unit. An apparatus for a user in outer space or on another planet.

22 Claims, 11 Drawing Sheets

(51) Int. Cl.
  *B63C 11/42*  (2006.01)
  *B01D 53/62*  (2006.01)
  *B63C 11/18*  (2006.01)
  *B63B 21/26*  (2006.01)

(52) U.S. Cl.
  CPC ........ *B63C 11/44* (2013.01); *B01D 2251/302* (2013.01); *B01D 2251/404* (2013.01); *B01D 2257/504* (2013.01); *B01D 2258/06* (2013.01); *B01D 2259/4566* (2013.01); *B63B 2021/267* (2013.01); *Y02C 10/04* (2013.01); *Y02C 10/08* (2013.01)

(56) References Cited

U.S. PATENT DOCUMENTS

| | | | | |
|---|---|---|---|---|
| 3,706,206 A | * | 12/1972 | Clark | B63C 11/34 405/185 |
| 3,729,005 A | * | 4/1973 | Lee | A61F 13/49406 604/366 |
| 3,800,722 A | * | 4/1974 | Lepage | B63C 11/42 114/333 |
| 3,875,753 A | * | 4/1975 | Ehlers | B63C 11/44 405/185 |
| 3,924,616 A | * | 12/1975 | Banjavich | B63C 11/24 128/201.25 |
| 4,026,283 A | * | 5/1977 | Banjavich | B63C 11/24 128/201.27 |
| 4,208,152 A | * | 6/1980 | Colston | B63C 11/28 126/204 |
| 4,724,790 A | * | 2/1988 | Blanc | B63C 11/44 114/315 |
| 5,727,906 A | * | 3/1998 | Nuckols | B63C 11/325 126/204 |
| 2002/0083653 A1 | * | 7/2002 | Hilbert | E04H 1/1277 52/2.17 |

* cited by examiner

PORTABLE INFLATABLE HABITAT WITH MODULAR PAYLOAD, SYSTEM AND METHOD

CROSS-REFERENCE TO RELATED APPLICATIONS

This is a non-provisional of U.S. provisional application Ser. No. 62/302,608 filed Mar. 2, 2016, incorporated by reference herein.

FIELD OF THE INVENTION

The present invention is related to a portable diving apparatus for a diver underwater that has a breathable environment and a replacement modular payload which provides a breathable gas and a carbon dioxide scrubber. (As used herein, references to the "present invention" or "invention" relate to exemplary embodiments and not necessarily to every embodiment encompassed by the appended claims.) More specifically, the present invention is related to a portable diving apparatus for a diver underwater that has a breathable environment and a replacement modular payload which provides a breathable gas and a carbon dioxide scrubber, where the diver can sit and remove diving equipment to rest and/or decompress and/or carry out tasks within this breathable environment.

BACKGROUND OF THE INVENTION

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

Deep diving activities for science were carried out between 2002 and 2010 in the Bahamas as part of a 'Bahama Deep' initiative by Lombardi. Working dives were conducted to 450 feet of sea water (fsw) which required extensive decompression, on the order of several hours at the 20 fsw decompression stop alone before surfacing. This unproductive time was cause for developing a means to remove the diver from the unproductive environment and place him in a productive one. A portable inflatable habitat was developed for this purpose and deployed in 2012. The system was deployed for 72 consecutive hours and was utilized during two dives and resulted in a development path to continue to harness the potential of this new technology.

A second generation system was developed and deployed in Hong Kong in 2015. The emphasis of this system was to create functional space within the underwater environment that is readily deployable beneath floating stock and serves as a dependent means of life support for the occupant. This system was deployed for 48 consecutive hours and supported short visits by several student researchers over a 3 hour period.

Previous development efforts in underwater habitation have focused on large, permanent structures. These 'Man in the Sea' programs from the 1960's and 1970's are all but vanished due to several reasons including massive infrastructure required for deployment and operation, and significant expense. In fact, the US' only undersea habitat dedicated to science—NOAA's Aquarius—had recently faced imminent shutdown with the cut of its $3 million dollar annual budget. The project has since been reconstituted by Florida Atlantic University but continues to struggle with financial sustainability.

The prior art self-contained underwater breathing apparatus provides for about 8 hours of life support. This time is used for the cumulative bottom and decompression phases of the dive.

BRIEF SUMMARY OF THE INVENTION

The present invention allows these 8 hours to be utilized on the bottom for work/exploration, with the present invention augmenting the dive duration during the resulting extended decompression stays, e.g., enabling multiple sequential 8 hour work/exploration phases. The present invention is portable and modular to make it readily deployable and easily utilized by a board spectrum of the diving population with lower cost and infrastructure than existing platforms.

The present invention continues the development of a portable inflatable habitat and significantly improves human performance in the undersea environment. Coupling the delicate, intricate, and intimate performance of a human with extended, cost-effective, undersea stays contributes substantially to the marine sciences. In the context of exploration, coupling this new capability with established robotics and imaging technologies will provide a comprehensive technology platform by which vast areas of ocean space can be examined in an all new way.

The present invention is a next evolutionary step to an already successful exploration program of Lombardi funded by the National Geographic Society, where broad, multi-disciplinary research topics are being addressed at the lower limits of Mesophotic Coral Ecosystems (MCEs), a national science priority, to depths nearing 150 meters of sea water (msw).

The present invention pertains to a diving apparatus for a diver underwater. The apparatus comprises a portable habitat in which a breathable environment is maintained underwater. The habitat has a frame, and a collapsible envelope which is attached to the frame or anchored or ballasted. The collapsible envelope takes shape through inflation to an expanded state underwater. The habitat has a modular payload which removably attaches to the frame underwater. The habitat has a seat on which a diver can sit while the habitat is underwater. The modular payload has a breathable gas source to provide breathable gas for the diver to breathe in the habitat and a carbon dioxide scrubber which removes carbon dioxide from the environment when the habitat is underwater. The apparatus has an anchor mechanism attached to the habitat to maintain the habitat at a desired depth underwater.

The present invention pertains to a method for a diver to dive underwater. The method comprises the steps of positioning a habitat at a desired depth underwater. There is the step of inflating an envelope of the habitat to an expanded state in which the diver may enter to create a breathable environment in the envelope for the diver to breathe gas of the environment, the envelope attached to a frame of the habitat. There is the step of removably attaching a first modular payload to the frame. There is the step of removing the first modular payload from the frame while the frame is underwater. There is the step of removably attaching a second modular payload to the frame while the frame is underwater. The first modular payload and the second modular payload may each have a seat on which the diver can sit while the habitat is underwater, a breathable gas source to provide breathable gas for the diver to breathe in the habitat and a carbon dioxide scrubber which removes carbon dioxide from the environment when the habitat is underwater.

The present invention pertains to a system for supporting a diver underwater. The system comprises a first portable diving apparatus positioned at a first location underwater over time. The system may comprise a second portable diving apparatus positioned at a second location underwater over time and within a reasonable swimming distance of the first diving apparatus. The first and second apparatuses each having a habitat with a replaceable modular payload which supports the diver with a breathable environment over time underwater. There could be multiple, e.g., $3^{rd}$, $4^{th}$, etc. Nth . . . each positioned at variable desired locations or depths by which the diver can transit to conduct subsequent dive phases or work objectives or living functions such as sleep. As the prior apparatus' consumables are consumed or the apparatus is exited by the diver, the previous modular payload can be replenished for use by a subsequent diver. These multiple apparatus can be positioned at any distance that is capable for the diver to transit under his own power or with the aid of an underwater vehicle.

The present invention pertains to a diving apparatus for a diver underwater. The diving apparatus comprises a portable habitat in which a breathable environment is maintained underwater. The habitat has a collapsible envelope. The collapsible envelope takes shape through inflation to an expanded state underwater. The apparatus comprises a propulsion unit removably attached to the envelope to propel the habitat through the water.

The present invention pertains to an apparatus which provides shelter to a user from an external environment at a remote location. The apparatus comprises a portable habitat in which a breathable environment is maintained. The habitat has a collapsible envelope to allow ease of transport. The collapsible envelope is fully enclosed by a zipper or flap that isolates the breathable environment from the external environment when the zipper or flap is closed, and takes shape through inflation to an expanded state and supports a pressure inside the envelope which is greater than a pressure outside the envelope. The apparatus comprises a modular payload which removably attaches to the envelope. The modular payload has a breathable gas source to provide breathable gas for the user to breathe in the habitat and a carbon dioxide scrubber which removes carbon dioxide from the environment. The apparatus comprises an anchor mechanism having a cable or tether attached to the habitat and to the remote location to maintain the habitat at the remote location by providing an anchoring force at least equal to any buoyant force of the habitat resulting from its interior displacement when anchored in the external environment which has an atmosphere with a gas that is heavier than the breathable environment 16, or an anchoring force at least equal to any force resulting from momentum only under the habitat's own weight when anchored in the external environment which is a vacuum.

BRIEF DESCRIPTION OF THE SEVERAL VIEWS OF THE DRAWING

In the accompanying drawings, the preferred embodiment of the invention and preferred methods of practicing the invention are illustrated in which.

DETAILED DESCRIPTION OF THE INVENTION

Figure 1:
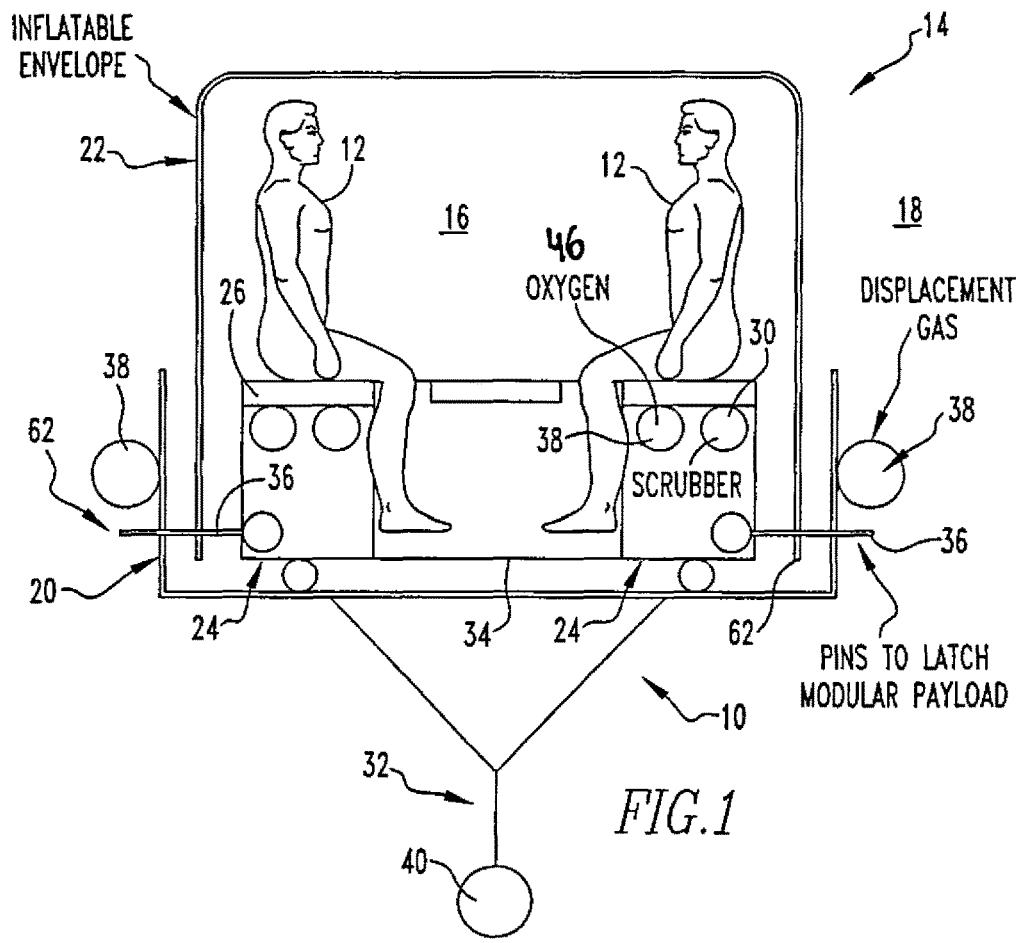
FIG. 1 is a schematic representation of the apparatus of the claimed invention.
Figure 2:
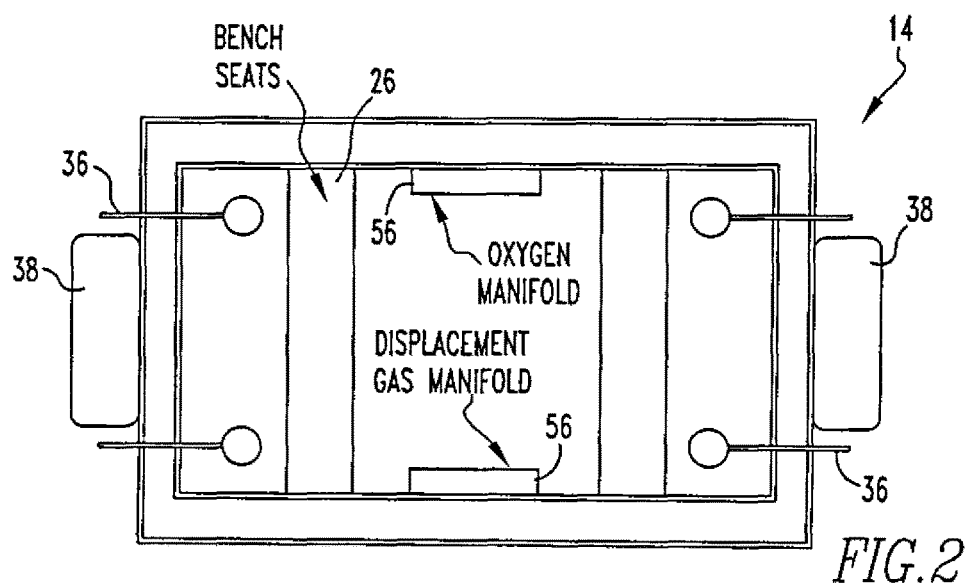
FIG. 2 is a schematic representation of an overhead view of the apparatus.

Referring now to the drawings wherein like reference numerals refer to similar or identical parts throughout the several views, and more specifically to FIGS. 1 and 2 thereof, there is shown a diving apparatus 10 for a diver 12 underwater 18. The apparatus 10 comprises a portable habitat 14 in which a breathable environment 16 is maintained underwater 18. The habitat 14 has a frame 20, although the frame is not necessary, and a collapsible envelope 22 which is attached to the frame 20. The collapsible envelope 22 takes shape through inflation to an expanded state underwater 18 if the frame 20 is present or to the envelope 22 if the frame 20 is not used. The habitat 14 has a modular payload 24 which removably attaches to the frame 20 underwater 18. The habitat 14 has a seat 26. The modular payload 24 may have the seat 26 on which a diver 12 can sit while the habitat 14 is underwater 18. The modular payload 24 has a breathable gas source 28 to provide breathable gas for the diver 12 to breathe in the habitat 14 and a carbon dioxide scrubber 52 which removes carbon dioxide from the environment when the habitat 14 is underwater 18. The apparatus 10 has an anchor mechanism 32 attached to the habitat 14 to maintain the habitat 14 at a desired depth underwater 18.

The modular payload 24 may be a replaceable cartridge 34 that fits within the frame 20 and envelope 22. The modular payload 24 may be secured to the frame 20 using pins 36, Velcro, carabiners, screws, fasteners that support the weight of the modular payload 24 and at least one human occupant of the habitat 14 underwater 18, if the seat is part of the modular payload 24. If the seat is an inflatable raft, or float, the pins 36 or fasteners do not need to support the weight of a human occupant, since the load of the occupant is on the raft or float. The modular payload 24 may be ballast to neutral buoyancy underwater 18. At least one gas cylinder 38 containing primary displacement gas may be fixed to the frame 20 to inflate the envelope 22.

Figure 3:
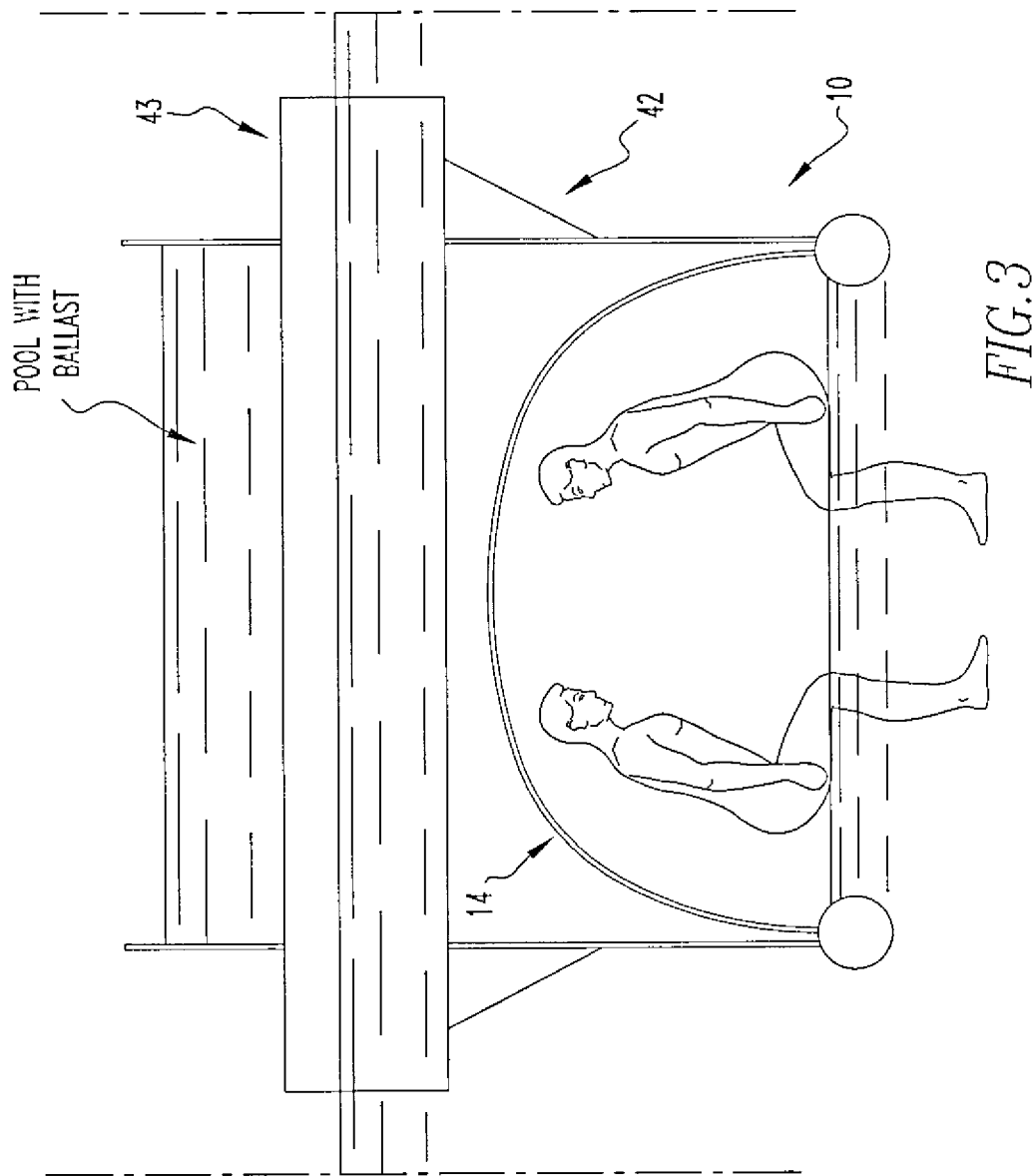
FIG. 3 is a schematic representation of the apparatus supported from above and a desired depth.
Figure 4:
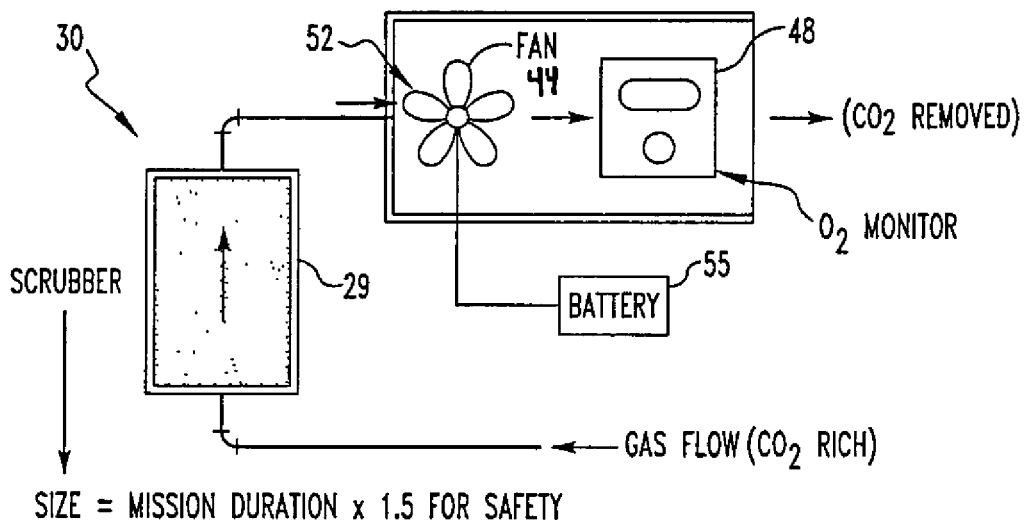
FIG. 4 is a schematic representation of a scrubber.
Figure 5:
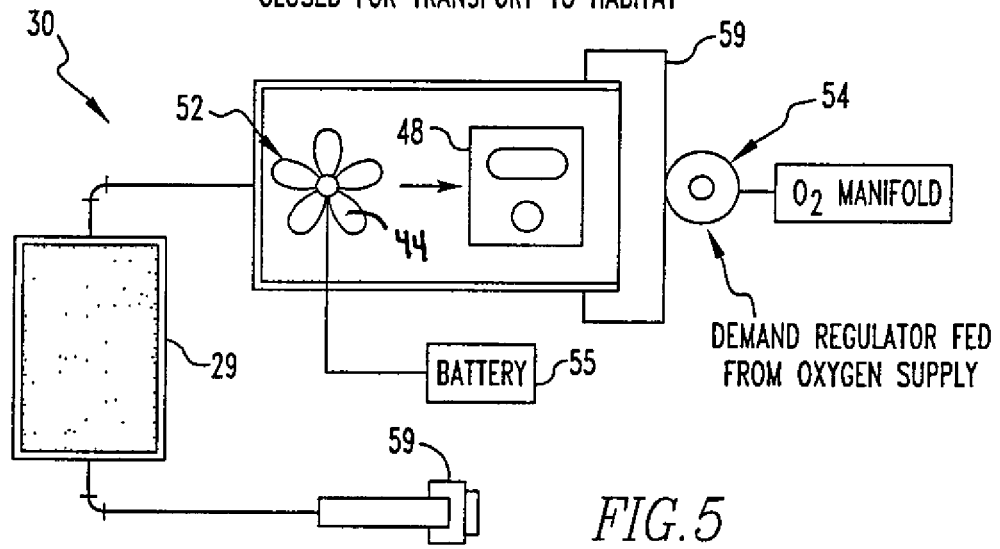
FIG. 5 is a schematic representation of the scrubber with end caps in place to protect it during transport and when not in operation.

The frame 20 may provide rigid support for the envelope 22 and from which the anchor mechanism 32 is affixed to a substrate 40 below the habitat 14, or to inverted scaffolding 42 extending from a surface structure 43 above the habitat 14, as shown in FIG. 3. Alternatively, the anchor mechanism 32 may affixed to the envelope 22 if no frame is present. The modular payload 24 may include a carbon dioxide scrubber 52 fan 44 in fluidic communication with the carbon dioxide scrubber 52, as shown in FIGS. 4 and 5. The modular payload 24 may include an oxygen source 46. The modular payload 24 may include an oxygen monitor 48 and an oxygen metering device 50. The modular payload 24 may include an emergency lung powered carbon dioxide scrubber 52 and emergency demand regulators 54 and a battery 55 or other power source.

The modular payload 24 may include a manifold 56 for routing displacement gas and oxygen in regard to the habitat 14. The envelope 22 may be constructed of a fabric or plastic or any sufficiently flexible material (e.g. metal foil) which is flexible to inflate with gas underwater 18 to the expanded state and which is impermeable to water or gas and has sufficient strength to contain pressure required to maintain inflation of the envelope 22 in the expanded state underwater 18 and constrain the buoyant force created from inflation of the volume of water displaced within the envelope. An example of the material that can be used is the same as that used in the Gen 1 system deployed in 2012 in the Bahamas, incorporated by reference, herein, and specifically is fabric embedded vinyl with RF (radio-frequency) welded seams.

Figure 11:
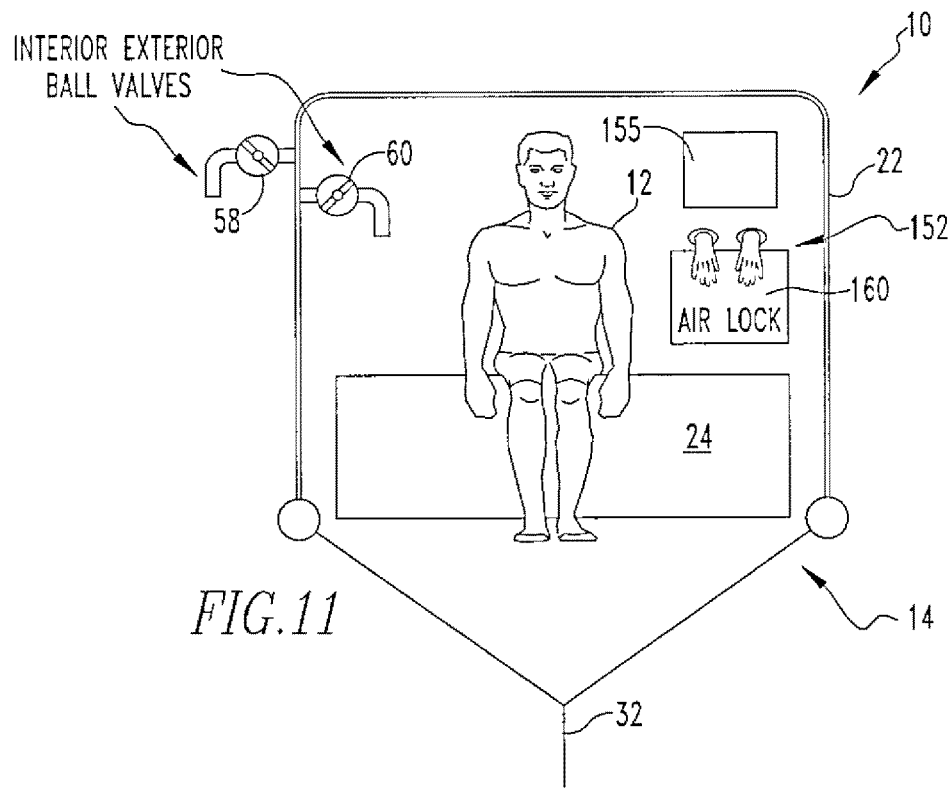
FIG. 11 is a schematic representation of the enclosure showing the quarter turn valves.

FIG. 11 shows a first quarter-turn valve 58 on the envelope's exterior may permit the envelope 22 to be deflated for stowage and transport, and a second quarter-turn valve 60 which is plumbed through the envelope 22 on the interior of the envelope 22 permitting deflation or pressure release from inside the envelope 22. The envelope 22 may have multiple fixation points 62 to allow the envelope 22 to be anchored to the frame 20. When the envelope 22 is deflated to the collapsed state, the envelope 22 may pack and stow within the frame 20 and is wrapped up using at least one strap 64, as shown in FIG. 6.

Figure 7:
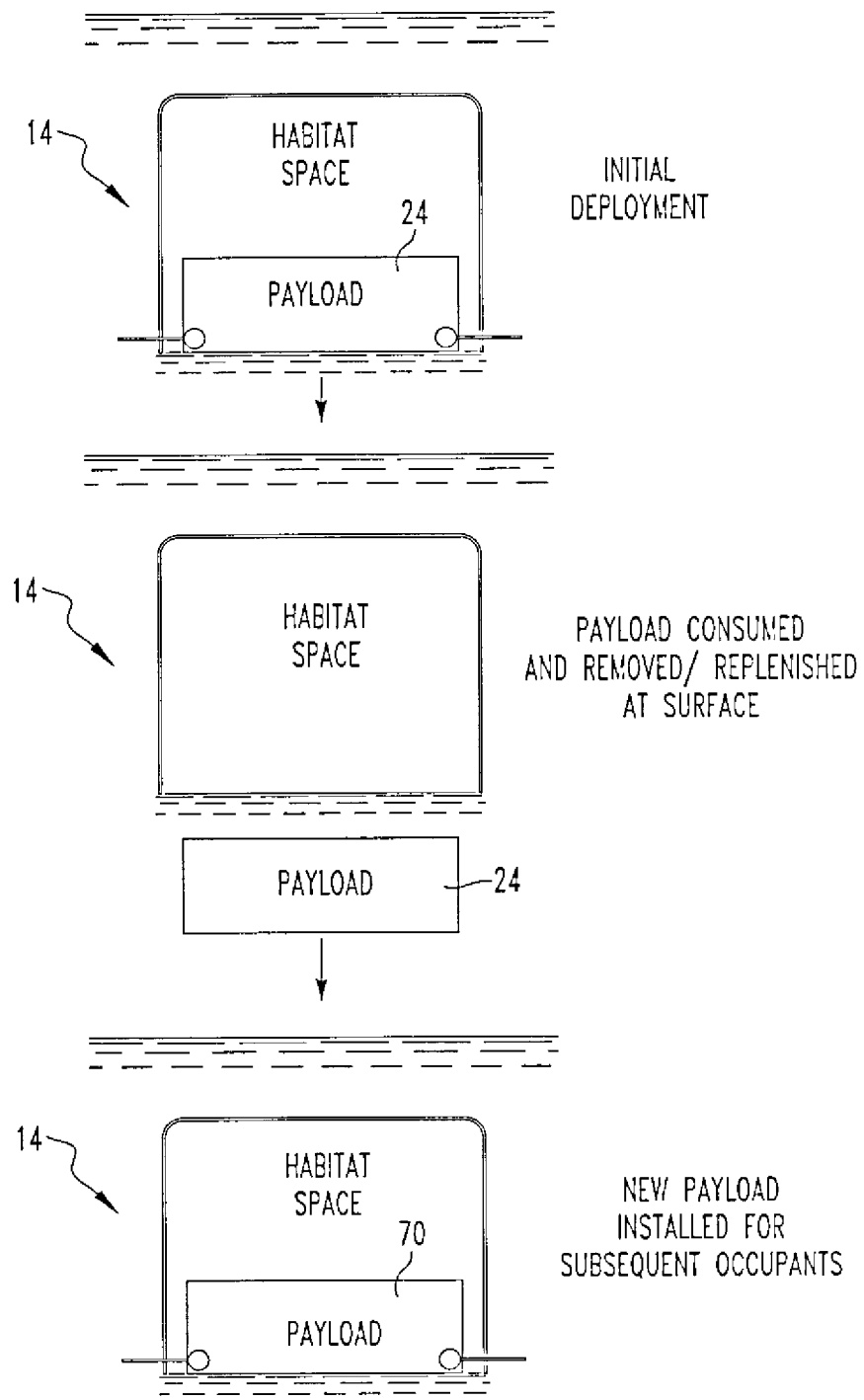
FIG. 7 is a representation of the method of the present invention.

With reference to FIG. 7, the present invention pertains to a method for a diver 12 to dive underwater 18. The method comprises the steps of positioning a habitat 14 at a desired depth underwater 18. There is the step of inflating an envelope 22 of the habitat 14 to an expanded state in which the diver 12 may enter to create a breathable environment 16 in the envelope 22 for the diver 12 to breathe gas of the environment, the envelope 22 attached to a frame 20 of the habitat 14. There is the step of removably attaching a first modular payload 24 to the frame 20. There is the step of removing the first modular payload 24 from the frame 20 while the frame 20 is underwater 18. There is the step of removably attaching a second modular payload 70 to the frame 20 while the frame 20 is underwater 18. The first modular payload 24 and the second modular payload 70 each have a seat 26 on which the diver 12 can sit while the habitat 14 is underwater 18, a breathable gas source 28 to provide breathable gas for the diver 12 to breathe in the habitat 14 and a carbon dioxide scrubber 52 which removes carbon dioxide from the environment when the habitat 14 is underwater 18. The same diver 12 may be in the habitat 14 or using the habitat 14 when the first modular payload 24 is replaced by the second modular payload 70, or different divers at different times may be in or using the habitat 14 when the first modular payload 24 is replaced by the second modular payload 70. In either case, when the first modular payload 24 is replaced by the second modular payload 70, the habitat 14 is continuously maintained underwater 18 so the habitat 14 is never removed from the water in order for the first modular payload 24 to be replaced by the second modular payload 70.

Figure 6:
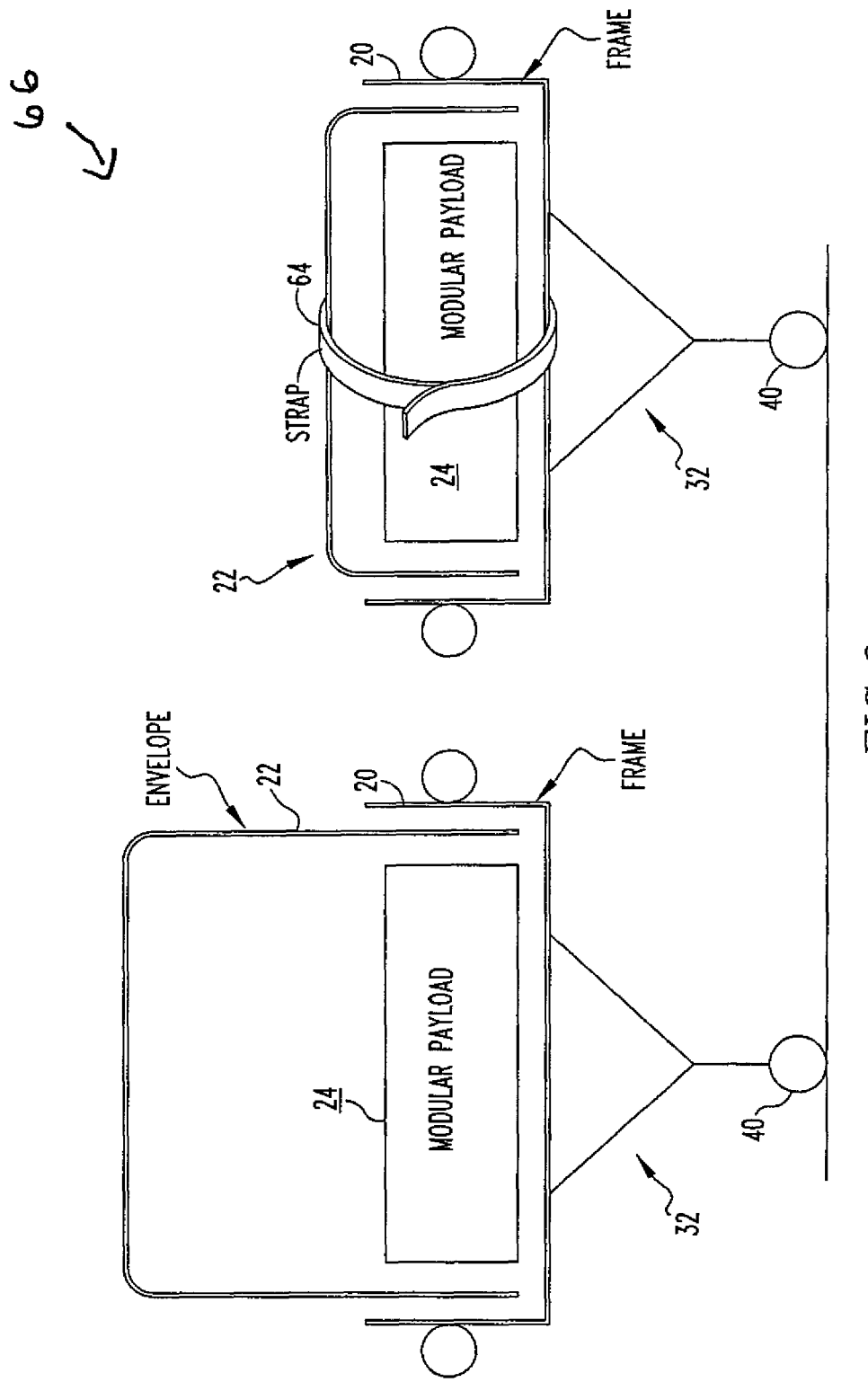
FIG. 6 is a schematic representation of a system of the present invention with one apparatus in an expanded state and a second apparatus in a collapsed state.

The present invention pertains to a system 66 for supporting a diver 12 underwater 18, as shown in FIG. 6. The system 66 comprises a first portable diving apparatus 68 positioned at a first location underwater 18 over time, such as anywhere between 6 hours to one, two days, four days, a week, two weeks or even months. The system 66 comprises a second portable diving apparatus 10 positioned at a second location underwater 18 over time and adjacent to or within 10 feet or a reasonable swimming distance of the first diving apparatus 10. In FIG. 6, the second portable diving apparatus 68. The first and second apparatuses each having a habitat 14 with a replaceable modular payload 24 which supports the diver 12 with a breathable environment 16 over time underwater 18. There may be significant value in placing a $2^{nd}$ habitat in "immediate" proximate—0 feet. As this could allow for an airlock/sealed ring to facilitate the connection of one habitat to another to expand the space and facilitate communication between individuals in more than one habitat. While not absolutely required, preferably each habitat would still be independently anchored.

In the operation of the present invention, Mesophotic coral ecosystems (MCEs), encompassing depths of 200 to 500 fsw, are a recent international priority in the ocean sciences as they are believed to account for a vastly overlooked region of ocean space, harboring new biotechnological discoveries, novel biodiversity, and clues into global climate change. Manned scientific diving to these depths is generally disregarded as the best tool for the job given the liabilities and perceived inefficiencies of humans working at these depths.

The present inventors have contributed to incremental advances in the technology and techniques to demonstrate cost-effective, efficient, and safe operations within the MCE; with a demonstrated productive track record of work taking place to depths of 446 fsw/136 msw within the past decade. Previous fieldwork in Exuma Sound using techniques for mixed-gas open-circuit SCUBA (Lombardi ed 2002) demonstrated utility value in diver based examinations, but proved highly inefficient with only minutes spent at target working depths (Lombardi 2003) from 90 to 100 msw. These early dives included tasks built on the 'square' dive profile, inclusive of a descent, bottom/work time, and ascent/decompression. The inventors continued work in 2010 and 2011 set out to establish advanced scientific diving methodologies using mixed-gas closed circuit rebreathers to depths approaching the MCE's lower limit (150 msw) as it is defined by Puglise et al. (2009)—well in excess of the 90 msw scientific diving depth threshold proposed at a 2006 Smithsonian Workshop (Lang and Smith eds. 2006).

Carefully examining actual dive profiles revealed that each dive included consistent patterns of operation. These include the initial descent (1) including time from first breaking the surface, through to the decision to commit to a deep vertical descent and leaving the 25 m reef crest; the precipitous descent (2) including time from leaving reef crest to hitting maximum target depth; the work phase (3) including time from reaching maximum depth, working along the vertical wall face, to reaching initial decompression stops; and the ascent/decompression (4) including time spent solely decompressing at or near the reef crest, and while suspended on the anchor mooring line in the water column.

This staged or phased approach to deep exploration dives allows one to identify possible standardization of operational procedures and safe practices, and work towards greater comfort and efficiency during each dive phase. Immediately obvious was the discomfort and lack of environmental control during lengthy decompression. This phase of the dive (85+/−22 minutes, Lombardi & Godfrey 2011) provided justification for development, construction, and experimentation with a portable underwater habitat in Spring 2012 (per National Geographic Society award W196-11). In other dives this can be MUCH longer—12-24 hrs or longer—e.g., days if coming from long duration at extreme depth. This system 66 afforded the divers respite from environmental exposure and subsequently the ability to carry out longer working bottom times (Lombardi, in prep).

One notable success among others in carrying out the work phase of the dive was the discovery and collection of a new species of fish, Derilissus lombardii (Sparks & Gruber 2012). This collection was the result of scouting ideal targets and further establishing multiple rotenone stations along the vertical wall, followed by collection of cryptic fishes. This burdensome process left only minutes for actual collecting—presenting the opportunity for improved efficiency during the work phase of the dive.

Deep exploration dives have been significantly enhanced with the use of a recently developed portable habitat used to augment decompression. This 'bottom up' approach—using portable habitat systems coupled with commercial off the shelf personal life support systems—provides for short, controlled underwater stays that add significantly to diver comfort, and thus prolonged wet exposures become feasible, both in augmented decompression from deep dives, and also long shallow exposures.

While human physiology does set practical limits in undersea exposures, it is believed there is an incremental step in undersea habitation that has been overlooked in practice. This being short (hours) to middle duration (a day or overnight) stays or even longer (multi-days) in a structure to provide respite during lengthy immersion or to train for longer missions (sea or space; science, adventure, or exploration). This places the possibility of saturation diving within reach of mainstream divers. Further demonstrating this capability will result in valuable and otherwise unattainable scientific data in an alien ocean environment, and further contribute to justifying continued incremental steps to a more permanent human presence on the seafloor in this century.

The apparatus 10 is a portable inflatable habitat 14 structure that creates an environment and atmosphere suitable for human occupancy that may be used within an ambient environment that is hostile or not suitable for human occupancy without adequate protection. The habitat 14 environment provides semi-permanent or permanent shelter from the hostile environment to allow humans to perform basic functions such as rest, eat, drink, and recreate, and also conduct work tasks. The habitat 14 environment 16 is maintained in a hospitable state by managing the atmospheric conditions within levels safe for human physiology. Systems 66 for this atmospheric management are introduced to the created environment via a modular payload 24 with the quantity of consumables keyed to mission requirements. This payload 24 eliminates the need for any surface connectivity or support. Upon consuming these supplies, the modular payload 24 can be readily removed from the habitat 14 environment and replaced with a fully charged payload 24 to permit longer stays, or a rotation of human occupants.

The portable inflatable habitat 14 has immediate applications in underwater 18 diving exploration by providing a readily deployable safe haven from the wet environment to carry out lengthy decompression in relative comfort and allowing improved intervention of medical personnel or simply improved verbal communications to surface support. Further, working divers such as scientists, may then utilize this respite to carry out studies on specimens collected before returning to the surface to reduce the physiological stress on the marine specimen. Combat divers may use this space to stage special operations (e.g. munitions depot) in a remote locale where submarine warfare may not be reasonably conducted.

Variations of the current system 66 will provide the opportunity to establish replenishable outposts away from base camps on other planets such as Mars. The following describes these practical market applications:

1. scientific exploration—increasing the envelope and location of scientific saturation diving. Habitats 14 can be staged adjacent to deep drop-offs to augment the decompression phase of scientific dives. Single habitats 14 with variable depth may be utilized for 'short' exposures. Or, multiple habitats 14 in close proximity might be staged at various depths where the divers will complete decompression at one depth, then move to the next structure to continue decompression at a subsequent depth. Rotating teams of divers 12 can conduct their work at depth, then cycle through these habitat 14 stays.
2. engineering/tunneling—on site work, recovery, repair, confined tunnels, etc. Many underground tunnel environments (freshwater aqueducts, sewers, utility tunnels) are submerged, partially submerged, or substantially isolated from a renewable air supply to the extent that the atmosphere within the environment is not suitable for sustaining human life. Currently, limited excursions within these environments are carried out with supplied air, or rebreather devices. However, these excursions are limited to the duration of the life support carried by the entrants and typically limited to an excursion which lasts only one shift. Carrying out further linear range extension of distance and duration will require establishment of habitats 14 that can provide a controlled and managed atmosphere for human occupancy. These depots can provide respite for the entrants, provide a depot to replenish consumables, and are a base from which to continue with the range extension.
3. cave diving—making it much safer, facilitating waystations and staging; likewise extending the range and depth for penetration/exploration. These extensions of linear range would be carried out same as described above for engineering/tunnel environments.
4. extending recreational sport diving—e.g., on ship wrecks, walls, deep reefs, etc. as well as longitudinal transits from habitat 14 to habitats 14, e.g., for multi-day diving along barrier reefs. Many sport diving destinations have invested in permanent environmentally-friendly mooring tackle on the bottom to restrict and reduce divers 12 anchoring on and destroying coral reefs. These moorings are ideal opportunistic habitat 14 anchorages. Today, sport dives are limited to the life support that can be reasonably carried by the individual. This includes both bottom gasses, and decompression gasses. Deploying an array of these habitats 14 at popular dive sites will allow vast extensions in underwater 18 dive time by utilizing the diver's carrying capability for the bottom portion of the dive, with the habitat 14 being depended upon for decompression.
5. diving safety—providing a portable and on-site "recompression chamber" to make sport diving safer (likewise since this is not surface supplied it could be useful in inclement weather in which the surface station/boat might need to leave the station or area) leaving divers 12 in the relative safety of the habitat 14 to ride out the storm. Remote sport or scientific diving sites are often many days away from a hyperbaric treatment facility. Given this, it is common practice to be extremely conservative when planning dives, and often times this means restricting depth and duration, hence exploration potential is reduced. Utilizing a portable inflatable habitat 14 as a safety buffer for decompression will allow dives within these remote regions to be more aggressive and realize exploration potential, without on-site hyperbaric chambers. In addition to Diving Safety, that the habitat can be used as a low-cost and readily deployable alternative to hyperbaric chambers, as it can be stationed at the surface, in case divers do get the bends and then can be used to "remediate" them—deployed w/the diver and medical safety officer to any desired depth to provide the commensurate desired pressure (e.g., similar to the pressure developed in the much bigger, more expensive hyperbaric chamber)
6. military applications—Special operations forces often establish temporary camps to stage their mission personnel, ammunitions, or other ancillary support. When special operations occur from the water, combat swimmers or divers 12 utilize stealth modes of transportation from a mother ship or helicopter drop to transit through the waterway and to the beach or waterfront area. In some cases, it may be advantageous to establish temporary structures underwater prior to storming the beach, where munitions can be stored, advanced weaponry can be assembled or the mission can stall until the waterfront is cleared. These habitats 14 can then be removed without leaving a trace.

The apparatus 10 incorporates several key desirable design features:
1. Lightweight, collapsible, readily transportable structure for human occupancy that isolates and protects the human occupant from the ambient environment.
2. Structure permits occupant to remove him/herself from the ambient environment while remaining under ambient atmospheric pressure and conditions.
3. Structure is inflatable, taking shape of pre-fabricated shell design when inflated with gas to ambient pressure (i.e. no structural frame required).
4. Structure anchored using discrete, non-destructive array of pins 36 in bottom of seafloor or other substrate 40, such as a sunken ship, or solely anchored with frame 20 to support beneath overhead environment such as floating stock, within a cave, under ice, or similar.
5. Anchor/tethering mechanism 32 allowing for the variable positioning of the habitat 14 (either manually operated, with a motor, or on a timer or motor that is regulated by the physiology of the occupants blood chemistry (e.g., nitrogen bubbles/off-gassing), so as to optimize the decompression). Likewise the multi habitats 14 can be positioned so that a diver 12 can move from deeper saturation to shallower saturation, and then stay a final amount of time (e.g. 12 hours or overnight—w/some excursions from the habitat 14 at or below the shallow decompression stop depth) and be ready to return to the surface.
6. Autonomous, free of surface support, operation for all aspects of deployment, human occupancy, atmospheric management, and disassembly. No surface connectivity is required for operations or maintenance.
7. Primary structure may remain permanently or semi-permanently deployed, with payload 24 for life support, tools, or other ancillary devices capable of being plug and play to meet mission requirements. This plug and play may take place during and throughout missions.
8. Structure permits suitable accommodation for one to several occupants for variable durations as dictated by mission requirements. These could allow for sleep, cooking, and a wide range of activities of daily living (ADL).
9. Structure's integral life support equipment provides automatic regulation and maintenance of atmosphere at levels suitable for sustaining human life.

Components

Envelope 22

The main envelope 22 is constructed of a lightweight fabric which is impermeable to water or gas and has sufficient strength to contain the pressure required to maintain inflation. The envelope 22 may be any desired size and shape with its shape pre-determined by its construction. Any seams required for construction are sealed to be water or gas impermeable. It may be transparent or opaque. The envelope 22 may be open on the bottom to provide ingress, or include a zippered hatch to allow ingress/egress within the habitat 14 environment. A quarter-turn valve 58 is plumbed through the envelope 22 on the exterior permitting the habitat 14 to be deflated for stowage and transport. An additional quarter-turn valve 60 is plumbed through the envelope 22 on the interior permitting deflation or pressure release by the occupants. Multiple fixation points 62 line the interior of the habitat 14 to permit stowage of ancillary equipment. Multiple fixation points 62 around the perimeter of the envelope 22 allow the structure to be securely anchored to the main frame 20.

Frame 20

The main frame 20 provides the ridged support structure for the envelope 22 from which rigging materials can be affixed to anchor to substrate 40 below, or inverted scaffolding 42, as shown in FIG. 3, can be affixed for deployment below floating stock (such as beneath a barge or under ice). When the envelope 22 is deflated, it packs and stows within the frame 20 while using straps 64 for safeguarding during transit to deployment sites, as shown in FIG. 6. The frame 20 also serves as a frame 20 from which exterior ancillary items may be mounted or stowed such as exterior light fixtures or other permanent or semi-instrumentation or equipment. One or multiple gas cylinders 38 containing primary displacement gas is fixed to the frame 20. The displacement gas is selected based on optimized oxygen and inert gas content for the mission. The frame 20 provides fixation points 62 to fix the modular payload 24 within the envelope 22.

Modular Payload 24

The modular payload 24 is a cartridge 34 that fits within the frame 20 and envelope 22. It is secured to the frame 20 using pins 36 or fasteners of sufficient strength to bear the load of the payload 24 contents and the human occupants. The modular payload 24 is ballasted to neutral buoyancy for use in the underwater 18 environment to permit ease of transport to and from the habitat 14. The modular payload 24 cartridge 34 itself includes multiple seats or benches configured to meet ergonomic requirements of the occupants and their mission tasks. For instance, an apparatus 10 designed for a short stay might only permit sitting. An apparatus 10 designed for a longer stay might permit lying down. The seals 26 or benches may be inflatable themselves and separately float on the surface of the water in the envelope 22.

The modular payload 24 cartridge 34 contains all of the life-critical systems and consumables including a carbon dioxide scrubber 52, scrubber fan 44, oxygen cylinder, oxygen monitoring system, oxygen metering device 50, emergency lung powered scrubber 30, and emergency demand regulators 54. The modular payload 24 cartridge 34 also contains batteries to power lights, scrubber fan 44, and other ancillary items, and the manifold 56 to route displacement gas and oxygen within the system 66.

Consumables (carbon dioxide absorbent, oxygen, batteries) within the modular cartridge 34 payload 24 are provided in quantities sufficient to meet desired mission time requirements plus a margin of safety.

The cartridge 34 payload 24 is installed by placing it within the frame 20, lining up the attachment points, and inserting pins 36. The occupant may then enter the habitat 14 structure. The cartridge 34 payload 24 is uninstalled by exiting the habitat 14 structure, removing the pins 36, then removing the payload 24 cartridge 34. It would be technically feasible to do all of this on the inside of the habitat, too—should it be more desirable (easier) for the diver to be in the safety of the habitat while conducting the "hot-swap"

Life Support—Carbon Dioxide Removal

A canister 29, as shown in FIGS. 4 and 5, within the modular payload 24 cartridge 34 contains a granular chemical carbon dioxide absorbent, typically calcium hydroxide though also possibly lithium hydroxide. The canister contains a battery 55 powered fan 44 used to cycle the habitat's atmosphere through the scrubber 30 media, thus removing carbon dioxide. An oxygen monitoring device 48 is placed in-line with the flow through the scrubber 30 with a display placed for easy viewing by the occupants.

The quantity of carbon dioxide absorbent within the canister 29 is keyed to mission requirements plus an additional safety factor. During transport to and from the habitat 14, this canister is closed at both ends and pressure within the system 66 is regulated via the downstream supply of a demand regulator 54 fixed to the oxygen cylinder within the payload 24 cartridge 34. This demand regulator 54 maintains the pressure within the canister 29 to equal ambient pressure, therefore eliminating the possibility to crush under pressure. A pressure relief valve is fitted to the canister to allow the internal expanding volume to vent to the ambient environment to prevent the canister 29 from exploding.

Then the scrubber 30 is ready for use within the habitat 14, the end caps 59 are removed to provide exposure to the ambient atmospheric environment.

Should the electric fan 44 fail, a facemask is donned by the occupant and a supply hose is fit to the end of the scrubber 30 canister 29. The facemask includes directional flapper valves such that inhalations are drawn through the scrubber 30, and exhalations are exhausted to the habitat 14 atmosphere.

The invention provides a mechanism for transporting the carbon dioxide scrubber consumables from the surface to underwater to swap within the habitat system to extend the time of the underwater excursion. At the surface, the carbon dioxide absorbent is packed within a water-tight vessel, or cartridge, which is closed at both the gas inlet and gas outlet. When transported underwater, increasing ambient pressure is placed on the vessel, therefore gas is required to be added to the vessel to maintain equilibrium within the vessel and ambient pressure. This is achieved using a demand valve where a diaphragm that is sensitive to changes in ambient pressure will depress upon a tilt lever to open a valve seat and introduce gas from a regulated supply until the vessel is at ambient pressure. Once the pressure is equalized, the diaphragm is no longer depressed from the ambient pressure, thus releasing depression of the tilt lever and the valve seat closes. Once the scrubber has been introduced to the underwater habitat, the end caps can be removed, and the scrubber installed within the habitat's rebreather system. The expended scrubber can be transported back to the surface by placing end caps on the gas inlet and gas outlet On ascent, ambient pressure is decreasing, resulting in gas within the scrubber to expand. This is vented automatically utilizing an over pressure relief valve set at 1 to 3 psi. This maintains relative pressure equilibrium with the ambient environment such that the vessel will not become overpressurized and burst.

Life Support—Displacement Gas

Figure 8:
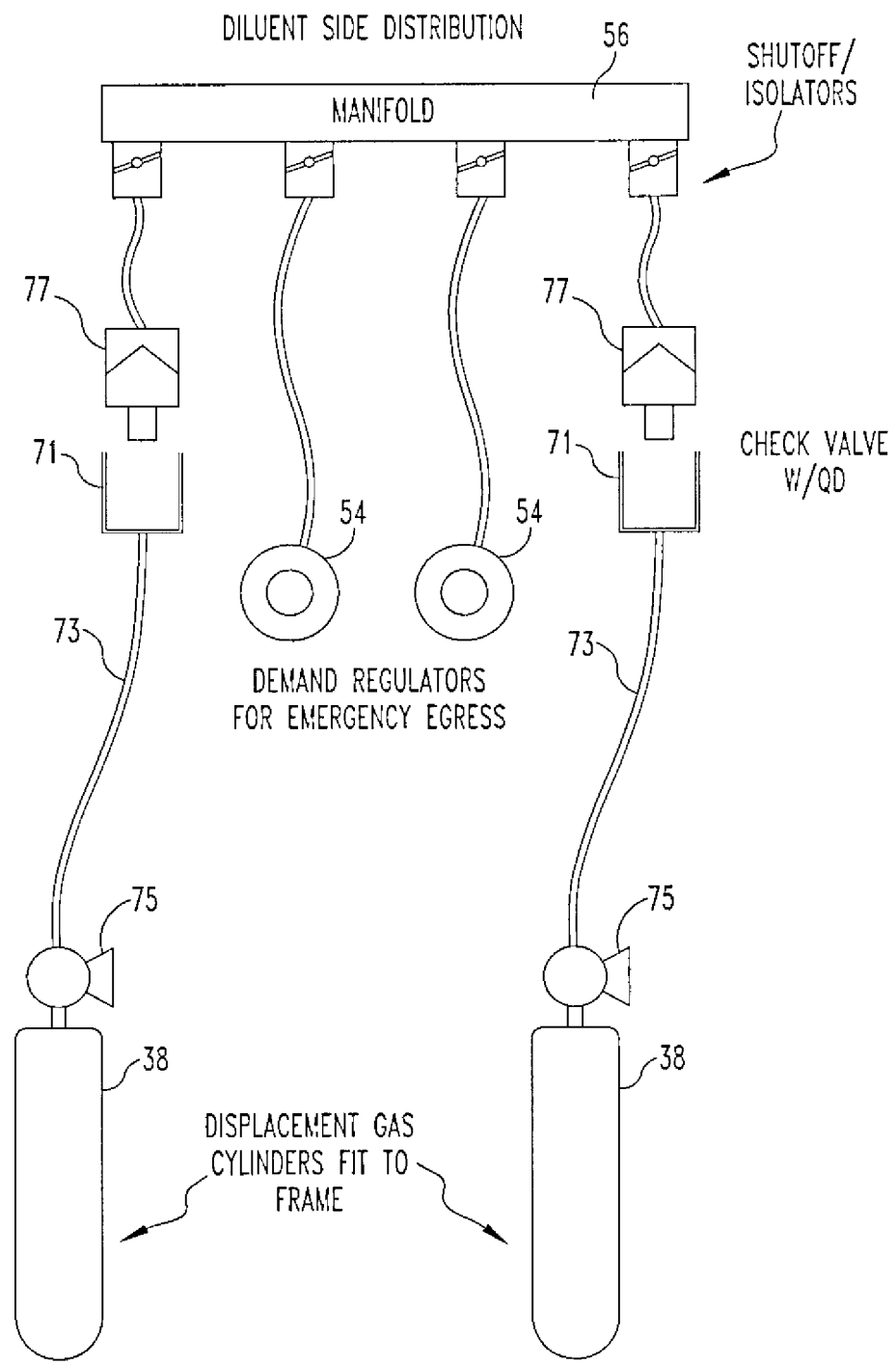
FIG. 8 is a schematic representation of the displacement portion of the present invention.

One or several gas cylinders 38 containing a suitable displacement gas are fixed to the exterior of the frame 20. Gas is selected based on the optimal physiological considerations for the mission and the habitat 14 occupants. This displacement gas must be of sufficient volume to displace 100% of the interior volume of the envelope 22 plus a reasonable safety margin. It should be noted that there will usually be a level within the habitat where water will be present—thus not 100% of the habitat will be filled. Also, there may be cases when less than 100% displacement is desirable, e.g., to reduce the forces and/or amount of gas that is needed. Also for shorter decompressions the full comfort of entering and sitting in the habitat may not be needed, but still having a smaller displaced space may be useful—e.g. for comfortable/clear communication and problem solving, etc. . . . Once the habitat 14 interior is displaced, displacement gas is no longer used during the mission except to counter any atmosphere leaks from the envelope 22, or to provide an emergency breathing supply via demand regulators 54. A female self-sealing quick disconnect fitting 71 is fit to the end of a whip 73 supplied from a regulator 75 on the displacement gas cylinder 38, as shown in FIG. 8. This female fitting 71 connects to a matching male self-sealing quick disconnect fitting 77 on the displacement gas manifold 56 within the modular payload 24 cartridge 34. From the manifold 56, this displacement gas may be actuated by a ball valve to provide direct displacement of the habitat 14 atmosphere, or accessed by a demand valve regulator 54 with mouthpiece. The habitat 14 will provide a minimum of one demand valve regulator 54 per occupant. The displacement gas may be breathed by the occupants in an emergency where the carbon dioxide scrubber 52 fails due to flooding or becomes otherwise inoperable.

Life Support—Oxygen Distribution

Figure 9:
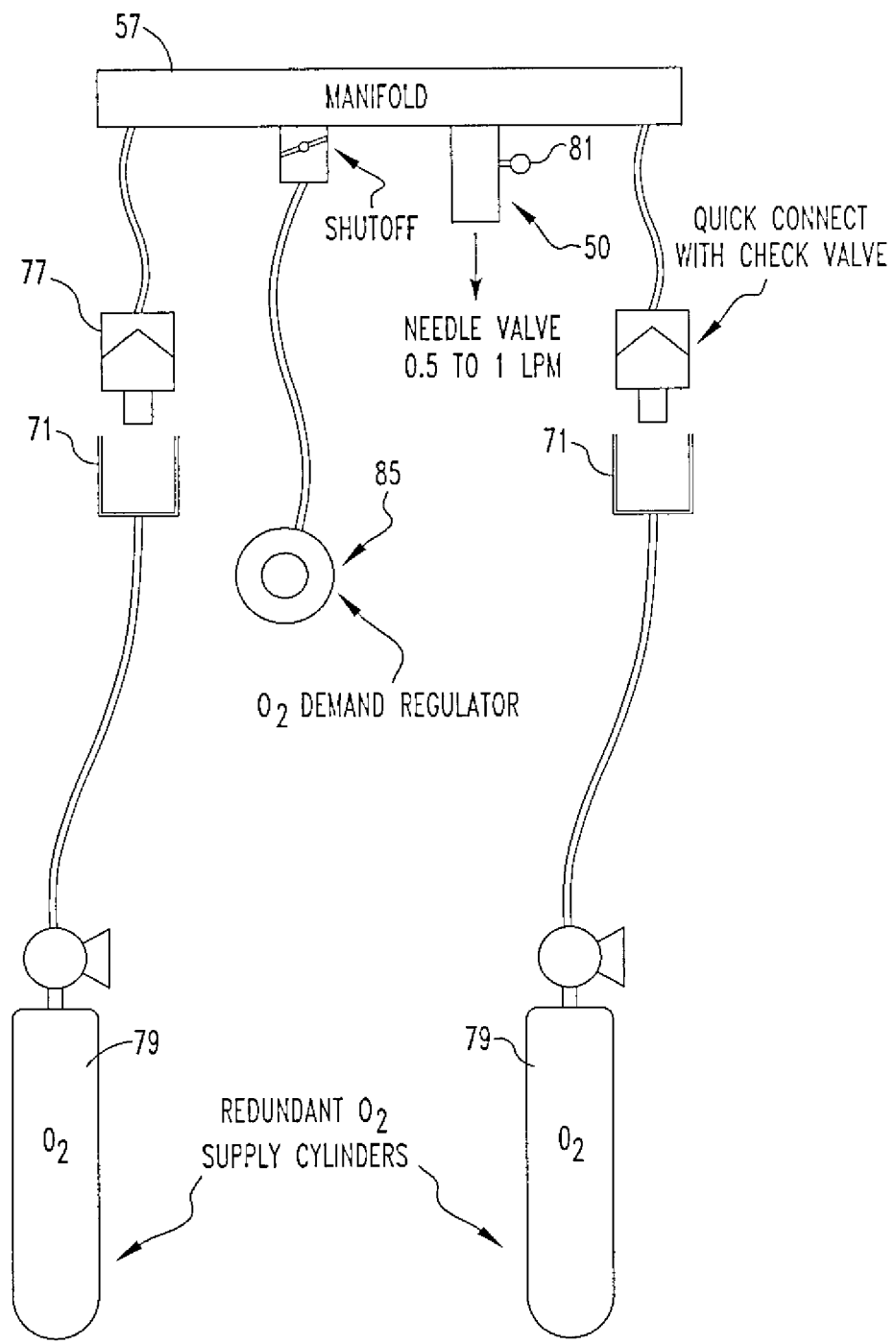
FIG. 9 is a schematic representation of the oxygen support portion of the present invention.

Oxygen cylinders 79 are secured within the modular payload 24 cartridge 34 and are of a sufficient volume to meet mission requirements plus a reasonable safety margin, as shown in FIG. 9. Oxygen is supplied by a regulator 81 through a self-sealing female quick disconnect fitting 7 that attaches to a self-sealing male quick disconnect fitting 77 on the oxygen distribution manifold 57 which is fitted to the modular payload 24 cartridge 34. Oxygen is distributed from the manifold 57 through a metering valve 50 that supplies oxygen to the habitat's atmosphere at a flow rate equal to or slightly less than the metabolic consumption rate of all occupants. This metering valve 50 can be adjusted manually or electronically by using feedback from oxygen sensors to account for occupants leaving or entering the habitat 14. Oxygen can also be added from the manifold 57 manually via a push button actuator. The oxygen supply can also be cross-supplied to the displacement gas manifold 56 such that oxygen can be accessed as an emergency gas supply if needed. Lastly, the oxygen manifold 57 supplies the demand regular 85 that regulates pressure flux within the scrubber 30 canister during transit of the modular payload 24 cartridge 34 to/from the habitat 14.

Power

The modular payload 24 cartridge 34 contains batteries 55 contained within housings or canisters that are not subject to the adverse effects of the external environment. Battery supplies are fit with an on/off switch. Batteries supply power to the scrubber 30 fan 44 and also supply power to exterior devices such as lights. Batteries 55 supplying lights are fixed to the lights with a matable plug that can be attached and detached as the modular payload 24 cartridge 34 is installed or removed. There could be other forms of power—human power (hand/pedal crank), capacitors, solar from surface, or hydro power from water flow.

Buoyancy/Ballast

The envelope 22 and main frame 20, when not inflated, is negatively buoyant in water. A bolus of displacement gas may be adjusted within the envelope 22 to create the desired positive, negative, or neutral buoyancy when transporting the habitat 14 to its deployment location.

The modular payload 24 cartridge 34 is ballasted with compression resistant foam to be neutrally buoyant with a full payload 24. This permits easy transport of the cartridge 34 to and from the habitat 14 structure.

Upon fully displacing the envelope 22 with displacement gas, the buoyant force exerted on the structure is equal to the displacement volume times the density of the medium being displaced.

Anchorage

Figure 10:
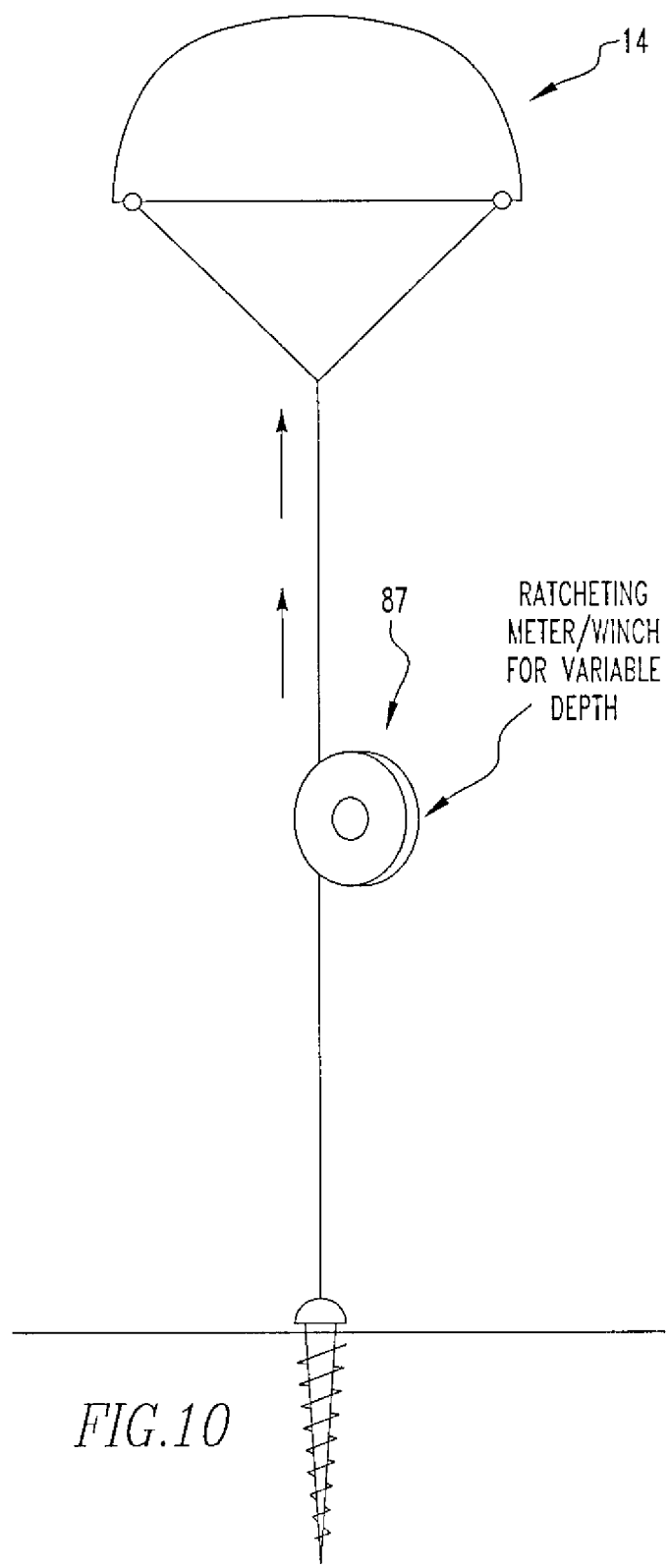
FIG. 10 is a schematic representation of the anchor mechanism providing for variable depth of the apparatus.

For deployment, the habitat 14 is secured to an anchor mechanism 32 that can withstand the maximum buoyant force plus a safety margin. The anchor mechanism 32 may be pre-installed mooring tackle, bolts, pins, or embedment anchors, or natural substrate 40 of opportunity. The habitat 14 is attached to the anchor mechanism 32 using straps 64, lines, shackles, and clips that can withstand the maximum buoyant force of the habitat 14 plus a safety margin. This anchor mechanism 32 may be fixed length to provide for deployment at the desired fixed depth or location, or be configured with a line or chain hoist 87 or block and tackle to provide variable depth capability, as shown in FIG. 10. The mechanical advantage of any manually varied depth must be made such that a human can manually make the adjustment from within the habitat 14.

Operations

Deployment

A suitable anchorage is identified or installed in advance of the mission. The fully assembled habitat 14, with envelope 22 strapped down within the frame 20, is lowered into the water. A bolus of displacement gas is added and adjusted to achieve the desired buoyancy. Divers 12 then swim the habitat 14 to the anchorage and affix the rigging hardware. Additional displacement gas is added such that the habitat 14 becomes buoyant and outstretched to the desired elevation. One scenario is that the variable depth allows for variable desaturation, along the optimal "calculated" path/table for desaturation. For example, a diver could enter a deep habitat highly saturated and rest/sleep for hours while the diver is slowly rising through the water column, desaturating, and once fully desaturated, then the diver can wake up either at the surface or just below the surface such that the diver can then swim to the surface.

Ingress

Divers 12 approach the habitat 14 and remove their primary life support and stow it on the exterior of the habitat 14 to fixed rings or loops. The divers 12 enter the habitat 14 and sit or lie down in the occupant resting area. Displacement gas is added to fully displace the envelope 22. The caps 59 are removed from the scrubber 30 and the scrubber fan 44 is turned on with the battery power switch. The occupants verify that the scrubber fan 44 is blowing.

The oxygen system is turned on and metering valve 50 opened to establish a flow rate equaling for just lower that the metabolic consumption of the occupants. This can be verified by a stable reading on the oxygen monitoring device 49.

Atmospheric Management

Should the oxygen flow rate be too low, the oxygen monitoring device 49 will indicate a decreasing oxygen fraction within the atmosphere. The occupants can manually add oxygen using a push button actuator to boost this oxygen fraction while the metering device 50 is dialed up.

Should the scrubber 30 fan 44 fail, a half mask with directional flappers is installed on the scrubber 30 canister which then allows for the atmosphere to be cycle by the occupants' lungs.

Occupants will maintain the desired oxygen fraction for the duration of their stay.

Egress

The occupants shut down the oxygen system, shut down the fan 44 to the scrubber 30, and reinstall the scrubber 30 caps 59.

The occupants use demand regulators 54 fixed to long hoses from the displacement gas manifold 56 to exit the habitat 14 and locate their primary life support. Once primary life support is donned, the demand regulators 54 are stowed within the habitat 14.

Swap of modular cartridge 34 modular payload 24

Should the mission require that the habitat 14 envelope 22 remain deployed for a subsequent team of occupants, the modular cartridge 34 modular payload 24 only is removed and then replaced by the next set of occupants.

To remove the cartridge 34, the displacement gas is turned off and quick disconnects are released from the displacement gas manifold 56. The wet mateable connector for the external lights is released. The pins 36 securing the cartridge 34 to the frame 20 are removed. The cartridge 34 then slides out of the bottom of the habitat 14 and is shuttled to the surface or other location for replenishment.

The next team of occupants returns to the habitat 14 with a freshly configured cartridge 34 and installs within the habitat 14 using the pins 36. The displacement gas is connected to the displacement gas manifold 56. The external light wet mateable connector is connected. Occupants follow the procedure for ingress. If one team needs to have multiple modular payload swaps to complete their mission, then all of these (several of them) could be brought to the habitat at the beginning of their mission, allowing for a very long duration mission.

Recovery

To recover the apparatus 10, a quarter-turn ball valve 58 on the exterior of the envelope 22 is opened to vent displacement gas. The straps 64 used to secure the envelope 22 down within the frame 20 are tightened to aid in venting this gas. The remaining gas bolus is adjusted to provide the desired buoyancy for removal from the deployment location. The bottom anchorage is released and rigging stowed within the frame 20. The entire apparatus 10 is returned to the surface or other location for replenishment.

Figure 12:
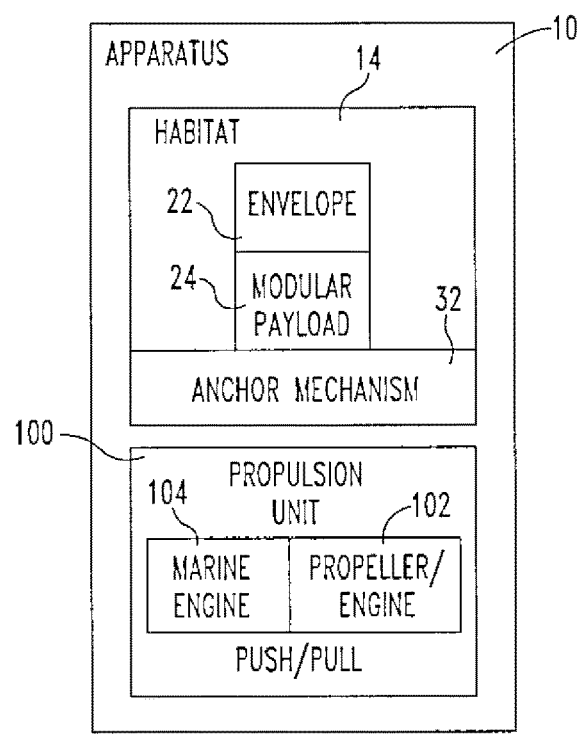
FIG. 12 is a block diagram of the apparatus as a submarine.

With reference to FIG. 12, the present invention pertains to a diving apparatus 10 for a diver 12 underwater 18. The diving apparatus 10 comprises a portable habitat 14 in which a breathable environment '6 is maintained underwater 18. The habitat 14 has a collapsible envelope 22. The collapsible envelope 22 takes shape through inflation to an expanded state underwater 18. The apparatus 10 comprises a propulsion unit 100 removably attached to the envelope 22 to propel the habitat 14 through the water.

The apparatus 10 may also be a "Submarine" configuration, since the habitat 14 is inflatable—it could be created in any aerodynamic/hydrodynamic form—the shape of a long lateral tube and could have any type/range of propulsion devices. It could have a human powered propeller 102 that extends down through the entry port of the envelope 22; it could have a battery powered propeller 102 that attaches to the outside of the envelope 22 but has wires that connect through the material of the envelope 22 in a water tight manner for a joystick control.

The diving apparatus 10 with the propulsion unit 100 may include all or some of the components described above. The propulsion unit 100 may be a marine engine 104, such as that found in submarines, or be propeller 102 motor 104 based. The propulsion unit 100 may be in front of the habitat underwater 18 and tow the habitat 14 with cable or rope attached between the habitat 14 and the propulsion unit 100, or on the side or behind the habitat 14 to push the habitat 14 through the water.

Figure 13:
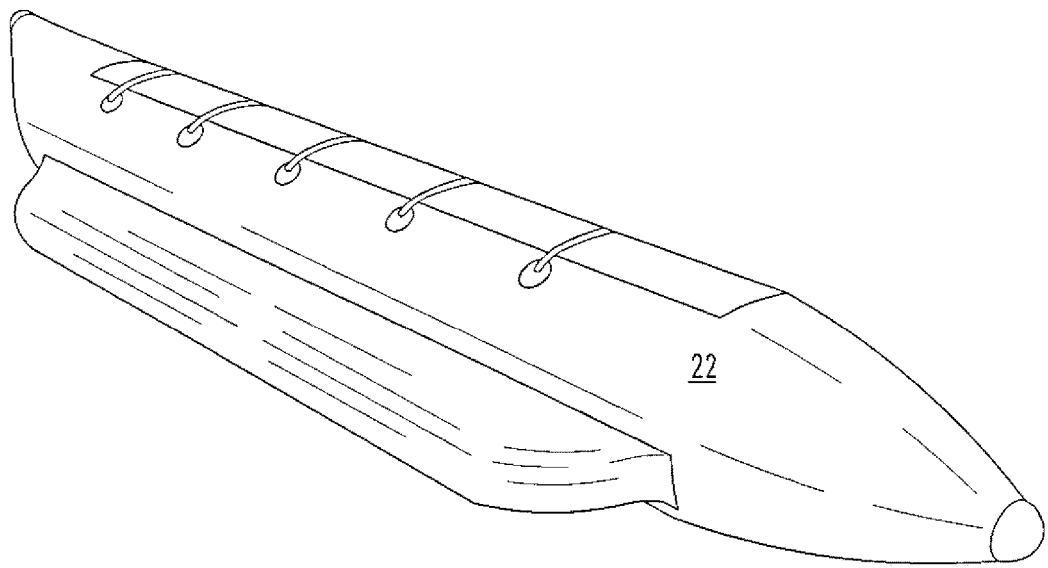
FIG. 13 shows a first embodiment of the configuration of the enclosure as a submarine.
Figure 14:
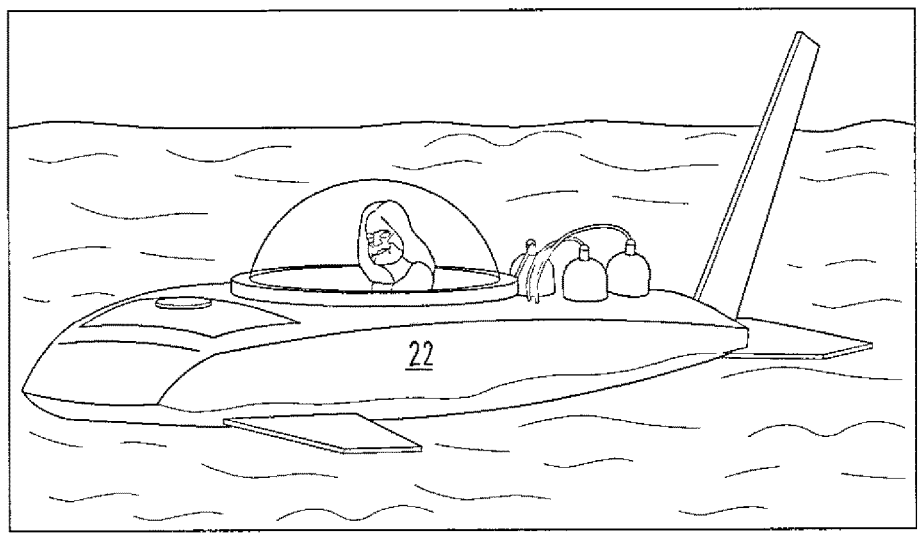
FIG. 14 shows a second embodiment of the configuration of the enclosure as a submarine.
Figure 15:
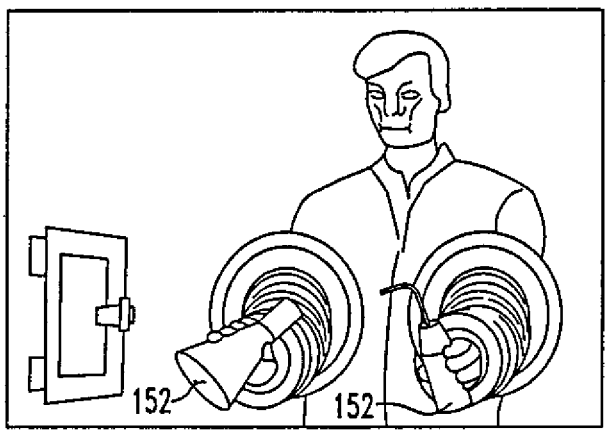
FIG. 15 shows gloves which extend from the enclosure.

FIGS. 13 and 14 show the hydrodynamic shape of the envelope 22—the use of control surfaces (ailerons/fins, ruder, etc.) may be important for navigation. FIGS. 11 and 15 shows gloves 152 that extend from the envelope 22 so an occupant in the envelope 22 underwater can do work or activities on objects in the water while the occupant is in the envelope 22. There is a window 155 in the envelope 22 above the gloves 152 so the occupant is able to see the gloves 152 and what the occupant is doing with the gloves 152 as work is performed with the gloves 152 on objects in the water outside the envelope 22. The gloves 152 may be positioned close enough to the bottom of the envelope 22 to allow for the easy transfer of objects or materials between the gloves and the interior of the envelope 22.

Alternatively, there may be an air lock 160 below the gloves 152, so objects can be passed through the envelope 22 to and from the gloves 152 without having to leave the envelope 22. Such an air lock 160 could be a flab in the envelope 22 under the gloves 152 and window 155 that has a zipper that opens and shuts the flap. On the outside of the flap is a pouch fixed to the envelope 22 that has a zippered flap too that the gloves 152 can zipper open and shut and which is water-tight. An object can be placed in the pouch from the inside of the envelope 22. The inside flap is then zipped shut so water cannot enter the envelope 22 when the outer flap is zipped open. Once the inner flap is zipped shut, using the gloves 152, the outer flapped is zipped open and with the gloves 152, the object is grabbed by the gloves 152 to be worked on in the water. When an object is to be moved from the water into the envelope 22, the aforementioned process is repeated, but backwards.

Figure 16:
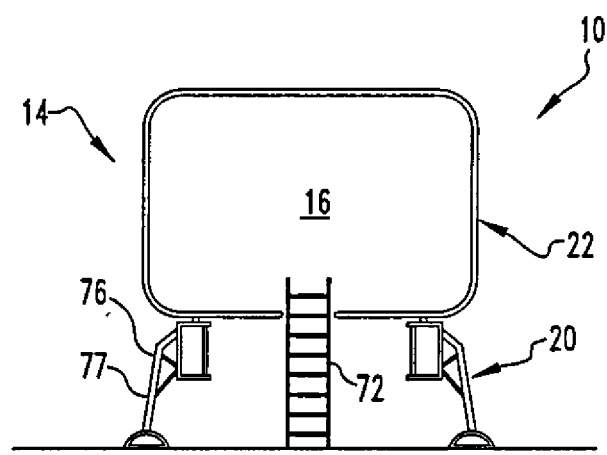
FIG. 16 is a schematic representation of the apparatus for a celestial body.
Figure 17:
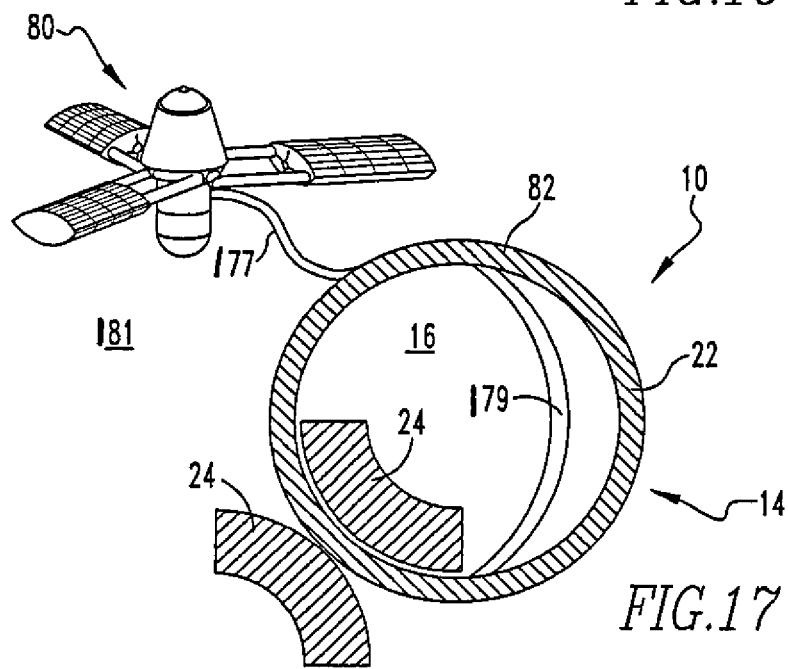
FIG. 17 is a schematic representation of the apparatus in outer space.

The present invention pertains to an apparatus 10 which provides shelter to a user from an external environment at a remote location. With reference to FIGS. 16 and 17, the apparatus 10 comprises a portable habitat 14 in which a breathable environment 16 is maintained. The habitat 14 has a collapsible envelope 22 to allow ease of transport. The collapsible envelope 22 is fully enclosed by a zipper or flap 179 that isolates the breathable environment 16 from the external environment when the zipper or flap 179 is closed, and takes shape through inflation to an expanded state and supports a pressure inside the envelope 22 which is greater than a pressure outside the envelope 22. A fully enclosed zipper or flap 179 is only required in the vacuum of space 181, though may be desirable underwater or on another planet 74. The apparatus 10 comprises a modular payload 24 which removably attaches to the envelope 22. The modular payload 24 has a breathable gas source 28 to provide breathable gas for the user to breathe in the habitat 14 and a carbon dioxide scrubber 52 which removes carbon dioxide from the environment. The apparatus 10 comprises an anchor mechanism 32 having a cable or tether 177 attached to the habitat 14 and to the remote location to maintain the habitat 14 at the remote location by providing an anchoring force at least equal to any buoyant force of the habitat 14 resulting from its interior displacement when anchored in the external environment which has an atmosphere with a gas that is heavier than the breathable environment 16, or an anchoring force at least equal to any force resulting from momentum only under the habitat's own weight when anchored in the external environment which is a vacuum. The apparatus 10 may have the additional features, as described above, for the specific application underwater 18 on earth, although in this embodiment, the application can be in outer space in relation to a space station or on another planet, or moon, or meteor or asteroid or other celestial body. On another planet, the cable or tether 177 may be a stand 76 of the frame 20 upon which the habitat 14 is disposed, and if gravity is too low, the stand 76/cable or tether 177 may be bolted down to the ground with stakes.

The apparatus 10 can be used to create temporary habitable space within any atmospheric condition that is uninhabitable by humans. To use the apparatus 10 with an open-bottom, the displacement gas chosen by the occupants must be lighter (less dense) than ambient atmospheric gas or fluid density such that the dense medium is displaced sufficiently to create an atmospheric space suitable for human occupancy and their personal atmospheric management. Atmospheric densities and make-ups vary greatly from planetary body to planetary body. As such, the displacement gas would be selected to be specific to the deployment location. A closed-bottom configuration may be utilized within the vacuum of space 81, where the inhabitable space is then isolated from the vacuum and the envelope 22 maintains its shape through maintaining positive pressure of the displacement gas within that space, or greater than 0 psig. The zipper or flap 79 would close the envelope 22 and essentially hermetically seal the internal environment of the envelope 22 from the vacuum of space. Once the user enters the envelope 22, the user would close the zipper or flap, and then activate the displacement gas tanks in the modular payload 24 to create the breathable environment 16 in the envelope 22 for the user to safely exist. The modular payload 24 is disposed within the envelope 22 in the close-bottom configuration. The modular payload 24 can be replaced in outer space just as described above. However, in outer space, when the modular payload 24 is replaced, the safest procedure is for the user to don his or her spacesuit because the breathable environment 16 is lost when the zipper or flap 79 is opened when the modular payload 24 is replaced. Alternatively, if there is an airlock within the enclosure, the replacement modular payload 24 can be carried through the airlock and then inserted into the place when the used modular payload 24 is removed. In this instance though, the safest procedure was still be for the user to wear his or her spacesuit during the replacement operation of the modular payload 24.

Similarly to the underwater 18 application (a dense atmospheric fluid medium), the length of stay within the habitat 14 is determined by the limitations of the consumables within the modular payload 24. Modular payloads 24 can be swapped to provide additional length stays within the structure. For instance, a reconnaissance survey team would leave a Mars base-station and be dependent on the personal life support supplied from their space suit PLSS (primary life support system) for the outbound excursion, inbound return, and some reserve for emergency. A portable inflatable habitat 14 could be deployed at the outbound excursion limit and spare modular payloads 24 stowed for subsequent extended range visitation. The next survey team would arrive at the habitat 14 with additional modular payloads 24, ingress to the habitat 14 envelope 22 for rest, conduct science, etc., replace the payload 24 prior to departure, then trek on a further outbound excursion. This process can be repeated with multiple inflatable habitats and multiple modular payloads to permit vast manned range extensions.

For example, the atmospheric make-up on Mars is 96% carbon dioxide plus trace elements accounting for a molar mass of 43.34 g/mol. The molar mass of air is 29 g/mol. Given the Martian atmosphere is equivalent to an altitude of >20 miles on Earth, very low pressure exists, and air would not be suitable for a displacement gas for life-sustaining considerations. The molar mass of oxygen is 32 g/mol and would be a more suitable displacement gas. This is analogous to high altitude climbing or aviation. Consideration would have to be placed on oxygen exposures impacting human physiology as well as recompression from extended stays at altitude. Anchoring the portable inflatable habitat 14 in this type of atmosphere is similar to the underwater 18 deployment, where the buoyant force requiring anchorage equals the mass of the medium displaced. To enter this habitat 14, the astronaut would climb steps or a ladder 72 to enter the space, purge the space with displacement gas, verify that the space contains a life-sustaining atmosphere, and then remove his space suit.

Alternatively, a closed-bottom configuration may be utilized on Mars or a similar planetary body, and within the vacuum of space, where the inhabitable space is then isolated from the vacuum and the envelope 22 maintains its shape through positive pressure of the displacement gas within that space greater than 0 psig. By maintaining any desired positive pressure, the displacement gas can be selected that best meets human physiological requirements for the anticipated mission duration. For example, at altitude (on Mars), lengthy exposure to pure oxygen would result in oxygen toxicity poisoning. This can be relieved with air breaks to reduce the oxygen exposure, however requires that the habitat 14 be pressurized such that oxygen content within air is life sustaining. Ingress/egress from a closed inflatable habitat 14 is via a zippered air-lock which is isolated from the main envelope 22. This air-lock can be equalized with ambient pressure to allow the space to be opened and closed, and then displaced to allow ingress/egress to within the main envelope 22.

For the embodiment as used in space 81, as shown in FIG. 17, with a cable or tether 77 extending from a space station 80 and a flap or zipper 79 to isolate the breathable environment 16 from space, with the modular payload 24 inside the envelope 22, and possibly one modular payload 24 attached to the outside 82 of the habitat 14, like in the underwater situation.

Regardless of the ambient atmosphere, the envelope 22 material must be selected to withstand ambient environmental conditions. In the case of underwater 18, in addition to withstanding the buoyant forces of the displacement gas, the material must be water and gas impermeable, capable of withstanding marine growth/biofouling during lengthy deployments, and retain its properties through a wide range of temperatures (on Earth, water temps from say 27 F to 100 F).

In space, all of these characteristics would be desirable in addition to withstanding high solar radiation, a wider range of temperatures (extremely variable pending location), and able to withstand impact from small space debris. Additionally, the material must be as lightweight as possible to fit within the carrying capacity of the deploying craft while leaving Earth.

Examples of materials for the envelope 22 that are preferred for use in outer space on other planets, moons, asteroids, meteors or other celestial bodies are Kevlar, see: http://www.space.com/19297-inflatable-space-stations-bigelow-aerospace-infographic.html, incorporated by reference herein; or interwoven Kevlar and mylar around an air bladder, see haps://en.wikipedia.org/wiki/Inflatable_space_habitat, incorporated by reference herein.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A diving apparatus for a diver underwater comprising: a portable habitat in which a breathable environment is maintained underwater, the habitat having a collapsible envelope, the collapsible envelope takes shape through inflation to an expanded state underwater, the envelope having attachment points, and a modular payload which removably attaches to the envelope underwater, the modular payload having a breathable gas source disposed within the modular payload to provide breathable gas for the diver to breathe in the habitat and a carbon dioxide scrubber disposed within the modular payload which removes carbon dioxide from the environment when the habitat is underwater, the scrubber including a canister with a pressure relief valve fitted to the canister to allow internal expanding volume to vent to prevent the canister from exploding; and an anchor mechanism attached to the habitat to maintain the habitat at a desired depth underwater, the modular payload is a replaceable cartridge that fits within the envelope.

2. The apparatus of claim 1 wherein the habitat has a frame to which the envelope attaches.

3. The apparatus of claim 2 wherein the modular payload is ballast to neutral buoyancy underwater.

4. The apparatus of claim 3 wherein at least one gas cylinder containing primary displacement gas is attached to the frame to inflate the envelope.

5. The apparatus of claim 4 wherein the frame provides rigid support for the envelope and from which the anchor mechanism is affixed to a substrate below the habitat, or to inverted scaffolding extending from a surface structure above the habitat.

6. The apparatus of claim 5 including pins which are disposed through the attachment points and the modular payload to removably attach the modular payload to the envelope.

7. The apparatus of claim 6 wherein during transport to the habitat down through the water, the canister is closed and pressure within the canister is regulated via a supply of a demand regulator fixed to the gas source within the payload, the demand regulator maintains pressure within the canister to equal ambient pressure, therefore eliminating a possibility for the canister to be crushed under water pressure.

8. The apparatus of claim 7 wherein the modular payload includes a carbon dioxide scrubber fan in fluidic communication with the carbon dioxide scrubber.

9. The apparatus of claim 8 wherein the modular payload includes an oxygen source.

10. The apparatus of claim 9 wherein the modular payload includes an oxygen monitor and an oxygen metering device.

11. The apparatus of claim 10 wherein the modular payload includes an emergency lung powered carbon dioxide scrubber and an emergency demand regulator and a battery.

12. The apparatus of claim 11 wherein the modular payload includes a manifold for routing displacement gas and oxygen in regard to the habitat.

13. The apparatus of claim 12 wherein the envelope is constructed of a fabric or plastic which is flexible to inflate with gas underwater to the expanded state and which is impermeable to water or gas and contains a pressure required to maintain inflation of the envelope in the expanded state underwater.

14. The apparatus of claim 13 wherein the envelope includes a first quarter-turn valve which is plumbed through the envelope on the envelope's exterior permitting the envelope to be deflated for stowage and transport, and a second quarter-turn valve which is plumbed through the envelope on the interior of the envelope permitting deflation or pressure release from inside the envelope.

15. The apparatus of claim 14 wherein the envelope has multiple fixation points to allow the envelope to be anchored to the frame.

16. The apparatus of claim 15 wherein when the envelope is deflated to the collapsed state, the envelope packs and stows within the frame and is wrapped up using at least one strap.

17. The apparatus of claim 16 including a seat disposed in the inflated enclosure.

18. A method for a diver to dive underwater comprising the steps of:
positioning a habitat at a desired depth underwater;
inflating an envelope of the habitat to an expanded state in which the diver may enter to create a breathable environment in the envelope for the diver to breath gas of the environment;
removably attaching a first modular payload to the envelope;
removing the first modular payload from the envelope while the envelope is underwater; and
removably attaching a second modular payload to the envelope while the envelope is underwater, the first modular payload and the second modular payload each have a seat on which the diver can sit while the habitat is underwater, the first modular payload has a breathable gas source disposed within the modular payload to provide breathable gas for the diver to breathe in the habitat and a carbon dioxide scrubber disposed within the modular payload which removes carbon dioxide from the environment when the habitat is underwater, the scrubber including a canister with a pressure relief valve fitted to the canister to allow internal expanding volume to vent to prevent the canister from exploding, the modular payload is a replaceable cartridge that fits within the envelope.

19. A system for supporting a diver underwater comprising:
a first portable diving apparatus positioned at a first location underwater over time; and
a second portable diving apparatus positioned at a second location underwater over time and adjacent or the first diving apparatus, the first and second apparatuses each having a habitat with an inflatable envelope and a replaceable modular payload which supports the diver with a breathable environment over time underwater, the modular payload having a breathable gas source disposed within the modular payload to provide breathable gas for the diver to breathe in the habitat and a carbon dioxide scrubber disposed within the modular payload which removes carbon dioxide from the environment when the habitat is underwater, the scrubber including a canister with a pressure relief valve fitted to the canister to allow internal expanding volume to vent to prevent the canister from exploding, the modular payload is a replaceable cartridge that fits within the envelope.

20. A diving apparatus for a diver underwater comprising:
a portable habitat in which a breathable environment is maintained underwater, the habitat having a collapsible envelope, the collapsible envelope takes shape through inflation to an expanded state underwater;
a modular payload which removably attaches to the envelope, the modular payload having a breathable gas source disposed within the modular payload to provide breathable gas for the diver to breathe in the habitat and a carbon dioxide scrubber disposed within the modular payload which removes carbon dioxide from the environment when the habitat is underwater, the scrubber including a canister with a pressure relief valve fitted to the canister to allow internal expanding volume to vent to prevent the canister from exploding, the modular payload is a replaceable cartridge that fits within the envelope; and
a propulsion unit removeably attached to the envelope to propel the habitat through the water.

21. A method for a diver to dive underwater comprising the steps of:
the diver entering an inflated portable enclosure with breathable gas underwater, the enclosure having an inflatable envelope, and a modular payload which removably attaches to the envelope, the modular payload having a breathable gas source disposed within the modular payload to provide breathable gas for the diver to breathe in the habitat and a carbon dioxide scrubber disposed within the modular payload which removes carbon dioxide from the environment when the habitat is underwater, the scrubber including a canister with a pressure relief valve fitted to the canister to allow internal expanding volume to vent to prevent the canister from exploding, the modular payload is a replaceable cartridge that fits within the envelope:
while the diver remains in the inflated enclosure, raising the enclosure in the water at a rate which desaturates the diver so the diver does not experience any bends; and the diver leaving the inflated enclosure at a depth greater than 10 feet without experiencing any bends.

22. An apparatus which provides shelter to a user from an external environment at a remote location comprising:

a portable habitat in which a breathable environment is maintained, the habitat having a collapsible envelope to allow ease of transport, the collapsible envelope is fully enclosed by a zipper or flap that isolates the breathable environment from the external environment, and takes shape through inflation to an expanded state and supports a pressure inside the envelope which is at least 1 psi greater than a pressure outside the envelope, and a modular payload which removably attaches to the envelope, the modular payload having a breathable gas source disposed in the payload to provide breathable gas for the user to breathe in the habitat and a carbon dioxide scrubber disposed in the payload which removes carbon dioxide from the environment, the scrubber including a canister with a pressure relief valve fitted to the canister to allow internal expanding volume to vent to prevent the canister from exploding; and an anchor mechanism having a cable or tether attached to the habitat and to the remote location to maintain the habitat at the remote location by providing an anchoring force at least equal to any buoyant force of the habitat resulting from its interior displacement when anchored in the external environment which has an atmospheric medium that is heavier than the breathable environment, or an anchoring force at least equal to any force resulting from momentum only under the habitat's own weight when anchored in the external environment which has a vacuum, the modular payload is a replaceable cartridge that fits within the envelope.

* * * * *